United States Patent
Sachdev et al.

(10) Patent No.: US 8,746,302 B2
(45) Date of Patent: Jun. 10, 2014

(54) LOW NOISE RUN-FLAT TIRES

(75) Inventors: Anil K. Sachdev, Rochester Hills, MI (US); William R. Rodgers, Bloomfield Township, MI (US); Howard William Cox, Bloomfield Hills, MI (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 472 days.

(21) Appl. No.: 12/497,000

(22) Filed: Jul. 2, 2009

(65) Prior Publication Data

US 2011/0000596 A1    Jan. 6, 2011

(51) Int. Cl.
*B60C 7/00*      (2006.01)
*B60C 19/00*      (2006.01)
*B60C 5/00*      (2006.01)

(52) U.S. Cl.
USPC ............ 152/155; 152/157; 152/158; 152/246

(58) Field of Classification Search
None
See application file for complete search history.

(56) References Cited

U.S. PATENT DOCUMENTS

| | | | |
|---|---|---|---|
| 3,318,756 A * | 5/1967 | Pollock | 428/114 |
| 3,647,608 A * | 3/1972 | Enlow | 442/371 |
| 3,920,061 A * | 11/1975 | Japp et al. | 152/504 |
| 4,884,609 A * | 12/1989 | Ho | 152/337.1 |
| 6,244,314 B1 | 6/2001 | Dodt et al. | |
| 6,588,473 B1 | 7/2003 | Walrond | |
| 7,243,534 B2 | 7/2007 | Ogawa | |
| 7,461,713 B2 | 12/2008 | Kojima | |

FOREIGN PATENT DOCUMENTS

| | | | |
|---|---|---|---|
| CA | 2167934 A1 | | 2/1995 |
| CN | 1132491 A | | 10/1996 |
| CN | 1695964 A | | 11/2005 |
| DE | 1479926 | * | 6/1969 |
| DE | 3129434 | * | 2/1983 |
| DE | 19715071 | | 10/1998 |
| DE | 19746649 A1 | | 4/1999 |
| DE | 102004044954 A1 | | 4/2005 |
| DE | 60316884 T2 | | 7/2008 |
| EP | 432079 | * | 6/1991 |
| EP | 0432079 A2 | | 6/1991 |
| EP | 870631 | * | 10/1998 |
| EP | 0870631 A2 | | 10/1998 |
| JP | 8-207508 | * | 8/1996 |
| JP | 8207508 A | | 8/1996 |
| JP | 2006-103606 | * | 4/2006 |
| JP | 2006103606 A | | 4/2006 |
| WO | 9503946 A1 | | 2/1995 |

OTHER PUBLICATIONS

German Office Action for German Patent Application No. 10 2010 025 642.0 dated Dec. 1, 2011.
CN Office Action for CN Application No. 201010261399.0 dated Dec. 31, 2012; 9 pgs.
CN Office Action relating to CN Patent Application No. 201010261399.0 dated Jun. 15, 2012.

* cited by examiner

*Primary Examiner* — Justin Fischer
(74) *Attorney, Agent, or Firm* — Cantor Colburn LLP

(57) ABSTRACT

A tire includes a pair of sidewalls in spaced apart relation and extending substantially radially from a respective inner circumferential portion to a respective outer circumferential portion, a tread extending between and connecting outer circumferential portions of the sidewalls, at least a portion of a tire cavity defined by the tread and sidewalls, and a bead portion on the inner circumferential portion of each radially extending sidewall, the bead portion providing an engagement surface for engaging a wheel on which the tire is to be mounted, and a noise reducing foam disposed in at least a portion of the tire cavity.

13 Claims, 5 Drawing Sheets

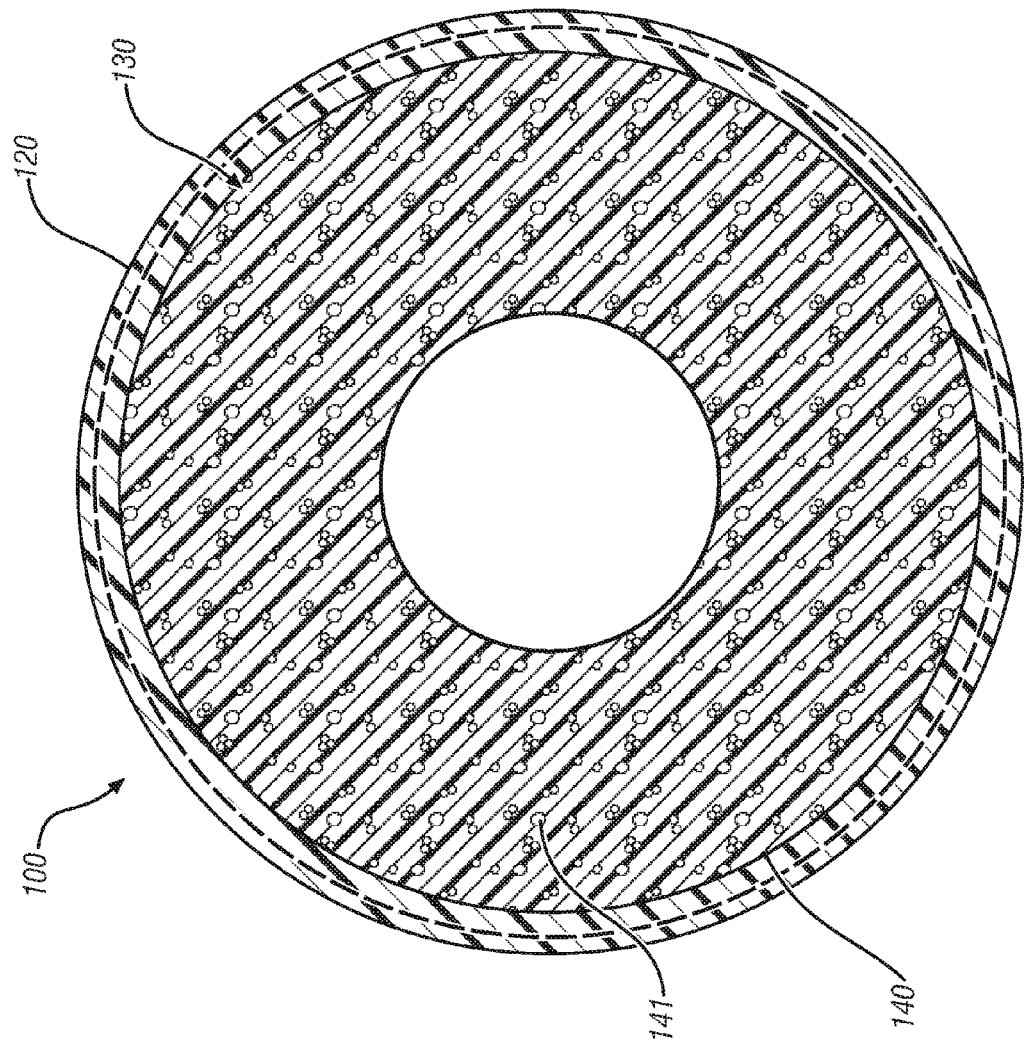
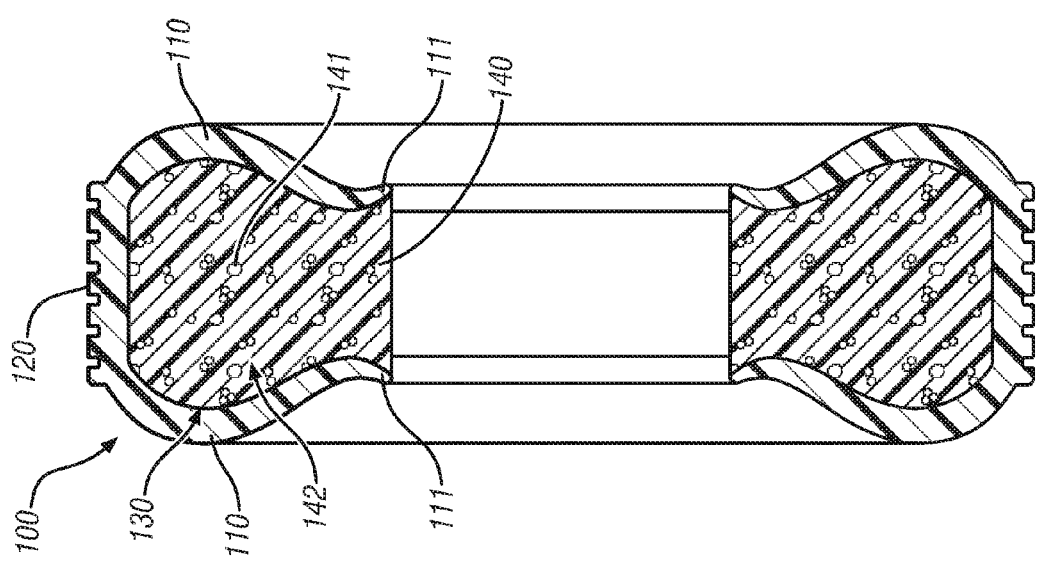

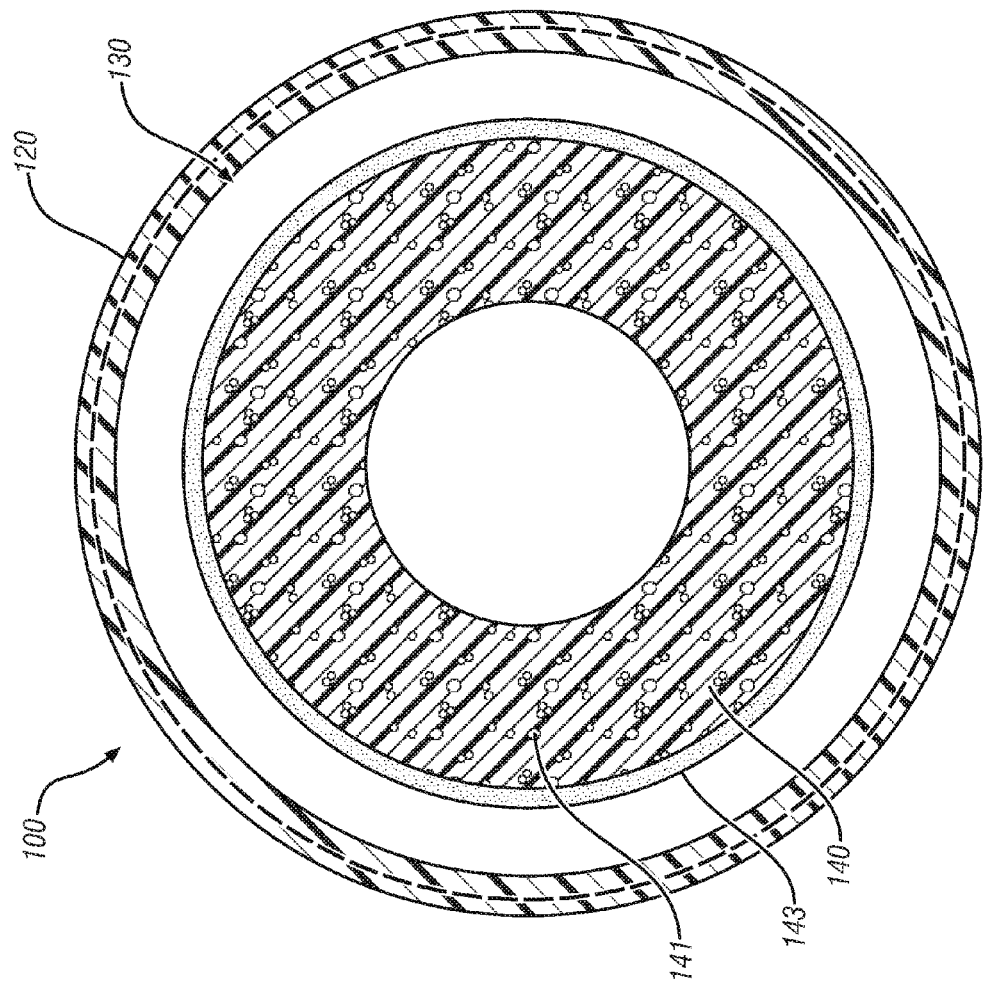
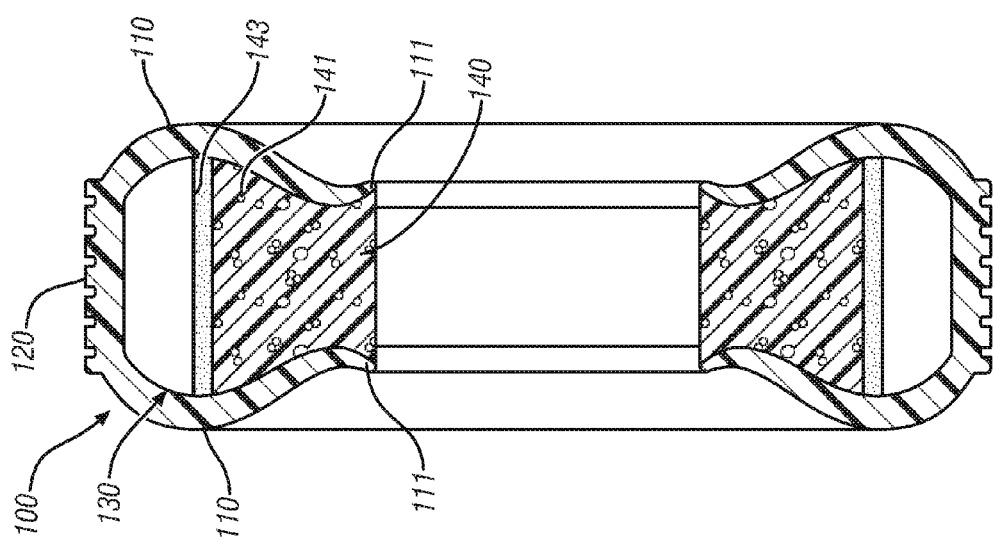

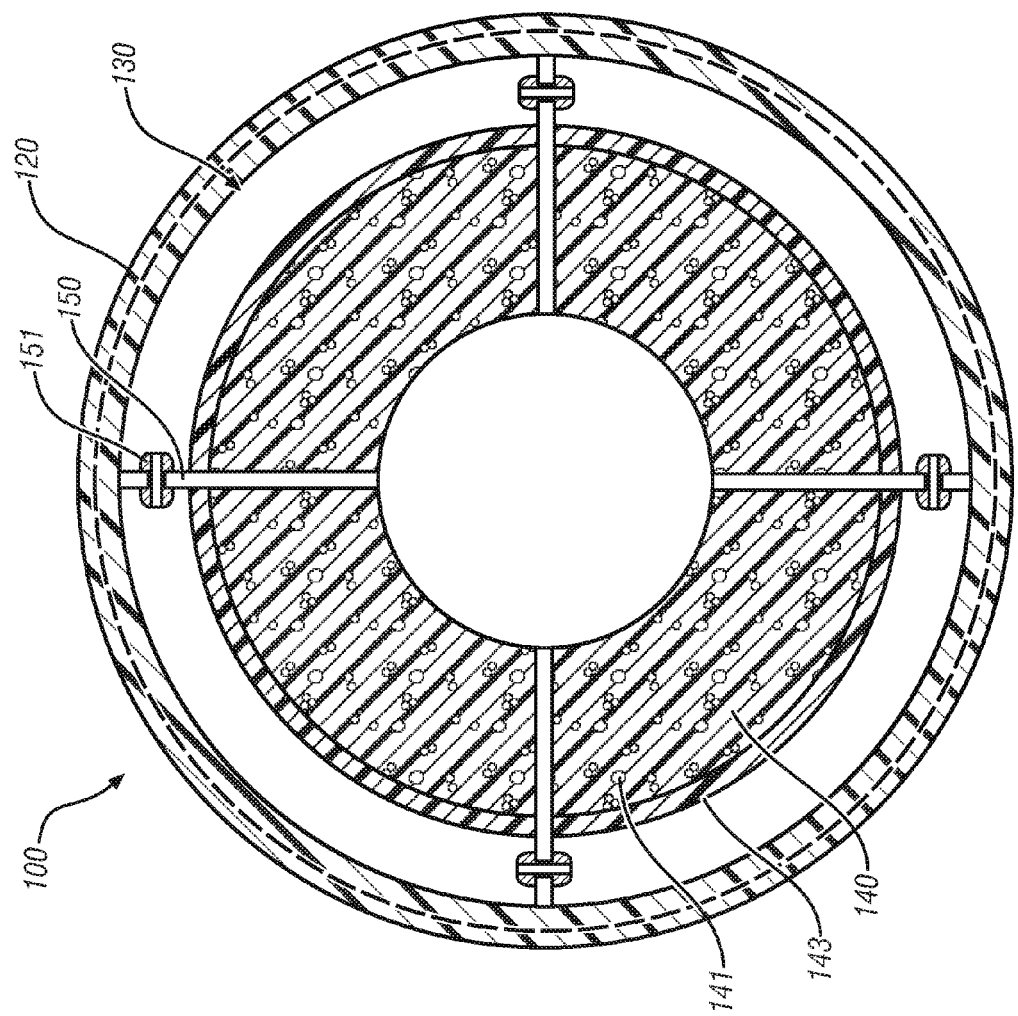
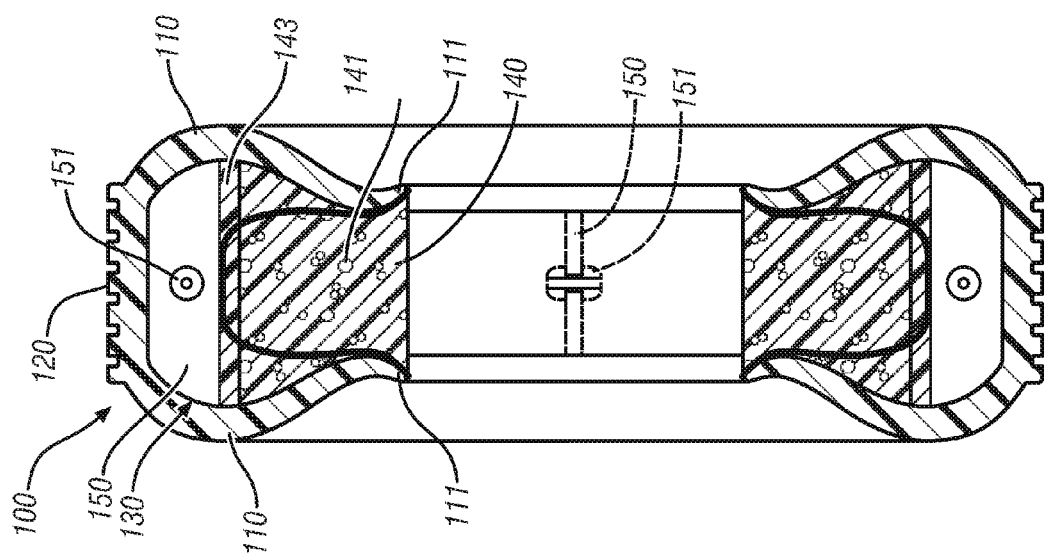

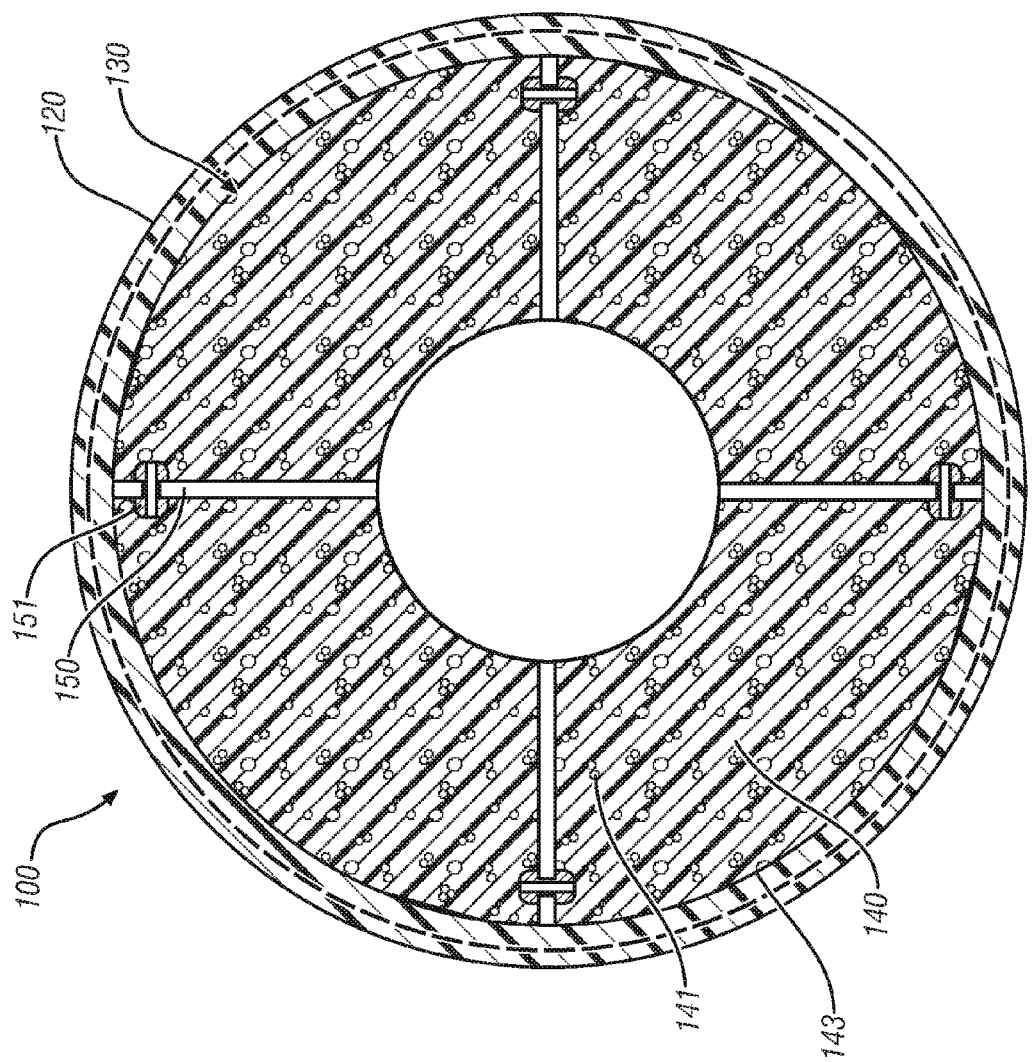
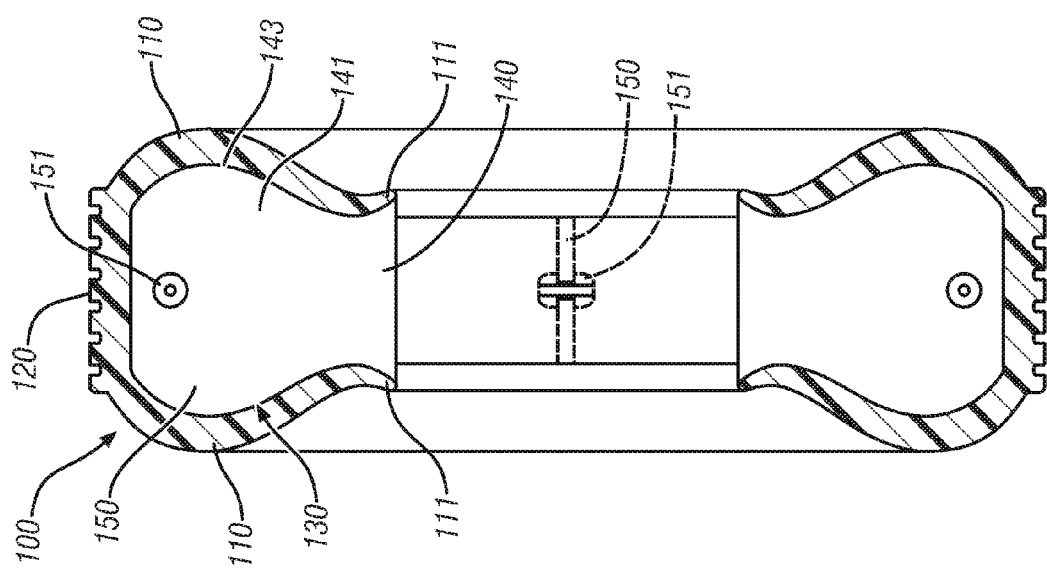

LOW NOISE RUN-FLAT TIRES

BACKGROUND OF THE INVENTION

The subject matter disclosed herein relates to tires for vehicles, and more particularly, to tires that generate less noise than prior art tires, as well as tires that can be used without being filled with pressurized gas.

BRIEF DESCRIPTION OF THE INVENTION

An embodiment of the invention includes a tire having a pair of sidewalls in spaced apart relation and extending substantially radially from a respective inner circumferential portion to a respective outer circumferential portion, a tread extending between and connecting outer circumferential portions of the sidewalls, at least a portion of a tire cavity defined by the tread and sidewalls, and a bead portion on the inner circumferential portion of each radially extending sidewall, the bead portion providing an engagement surface for engaging a wheel on which the tire is to be mounted. A noise reducing foam is disposed in at least a portion of the tire cavity.

Another embodiment of the invention includes a vehicle tire system having a system controller configured to receive at least one sensor output signal indicative of a value of at least one respective monitored characteristic of at least one tire. Each of the at least one tire includes a pair of substantially radially extending sidewalls, a tread extending between and connecting outer circumferential portions of the sidewalls, at least a portion of a tire cavity defined by the tread and sidewalls, and a bead portion on an inner circumferential portion of each radially extending sidewall, the bead portion providing an engagement surface for engaging a wheel on which the tire is to be mounted. The system controller includes a computer processor connected to a computer readable storage medium containing computer executable code that, when executed by the computer processor, causes the system controller to, responsive to the respective monitored characteristic of at least one tire departing from a predefined range of values, initiate an alarm.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 1 is a schematic cross sectional illustration, taken through a diametral plane of tread of a low noise tire according to embodiments disclosed herein;

FIG. 2 is a schematic cross sectional illustration, taken through a circumferential plane of the tread, of a low noise tire according to embodiments disclosed herein;

FIG. 3 is a schematic cross sectional illustration, taken through a diametral plane of the tread, of a low noise tire according to embodiments disclosed herein;

FIG. 4 is a schematic cross sectional illustration, taken through a circumferential plane of the tread, of a low noise tire according to embodiments disclosed herein;

FIG. 5 is a schematic cross sectional illustration, taken through a diametral plane of the tread, of a low noise tire according to embodiments disclosed herein;

FIG. 6 is a schematic cross sectional illustration, taken through a circumferential plane of the tread, of a low noise tire according to embodiments disclosed herein;

FIG. 7 is a schematic cross sectional illustration, taken through a diametral plane of the tread, of a low noise tire according to embodiments disclosed herein;

FIG. 8 is a schematic cross sectional illustration, taken through a circumferential plane of the tread, of a low noise tire according to embodiments disclosed herein;

DETAILED DESCRIPTION OF THE INVENTION

Figure 9:
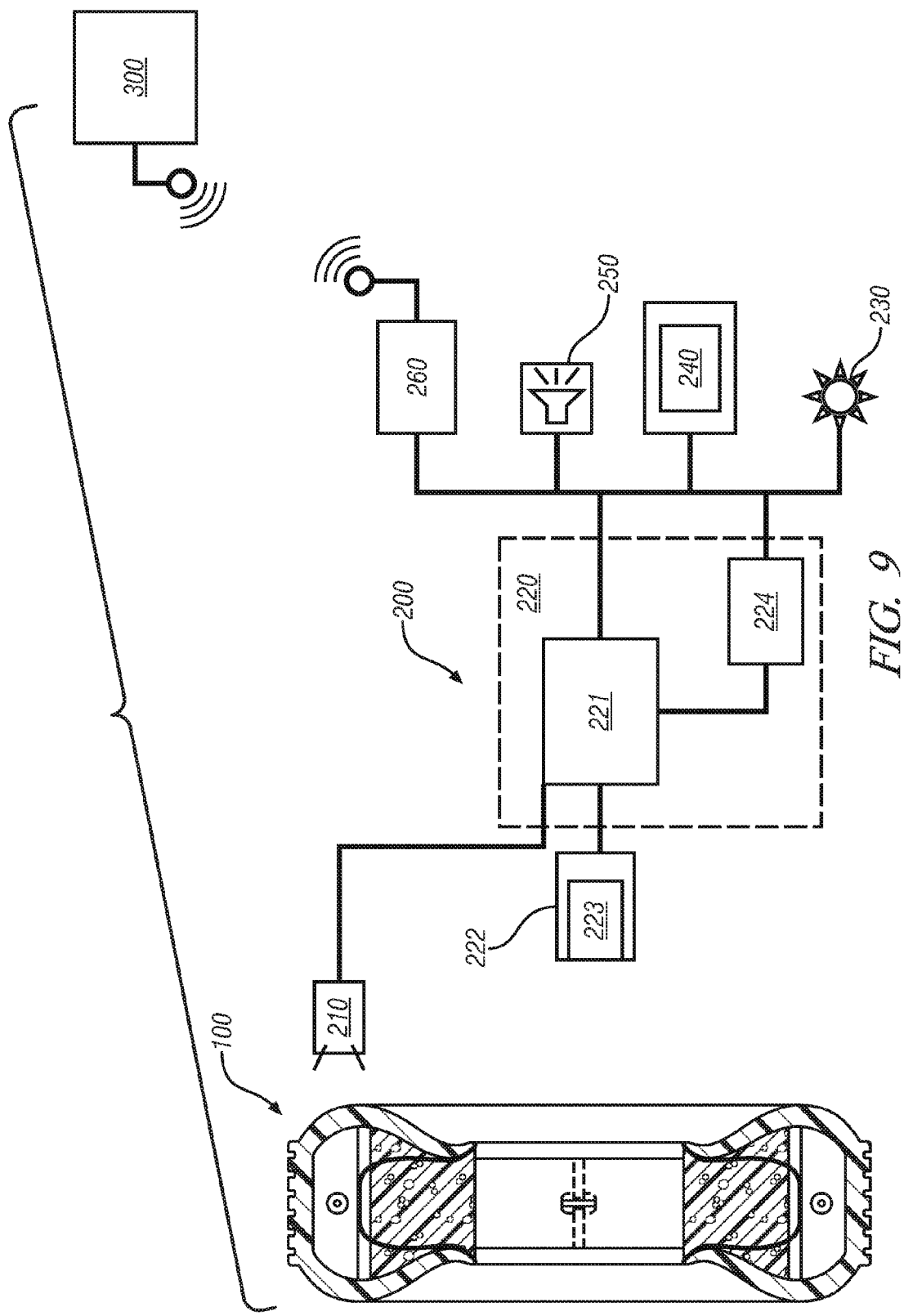
FIG. 9 is a schematic illustration of a vehicle tire system including a low noise tire according to embodiments disclosed herein; and The detailed description explains embodiments of the invention, together with advantages and features, by way of example with reference to the drawings.

FIGS. 1 and 2 show an example of a low noise tire 100 according to an embodiment disclosed herein. Two sidewalls 110 extend substantially radially from respective inner circumferential portions to respective outer circumferential portions in spaced apart relationship as particularly seen in FIG. 1. A tread 120 connects the sidewalls 110, and together the tread 120 and sidewalls define a tire cavity 130. In pneumatic tires, the tire cavity 130 is filled with pressurized gas, such as air. In the embodiment seen in FIGS. 1 and 2, the tire cavity 130 is substantially filled with a noise reducing foam 140, forming a substantially toroidal body 142 of noise reducing foam 140. Particles 141 are dispersed in the noise reducing foam 140 in embodiments to further reduce noise as will be explained below, though the particles 141 are not required to achieve noise reduction. As a result of the structure seen in FIGS. 1 and 2, the tire 100 is essentially non-pneumatic, though embodiments include toroidal bodies 142 permeated with pressurized gas. The embodiment of the tire 100 shown in FIGS. 1 and 2 therefore can run with no air, providing a run flat feature.

The noise reducing foam 140 in embodiments is selected for reduction of a desired range or ranges of frequencies of sound to be reduced. Additionally, the noise reducing foam 140 can be selected at least in part for its performance in run flat or non-pneumatic conditions. Open cell foams are used in embodiments, while other embodiments use closed cell foams and/or combinations of open and closed cell foams depending upon the particular noise reduction characteristics and/or performance characteristics desired.

To enhance noise reduction and/or performance, one or more characteristics of the noise reducing foam 140 is varied in the toroidal body 142 in embodiments. For example, a ratio of open cell to closed cell foam content can be varied with radial location, longitudinal location, or both. Other examples of characteristics of the toroidal body 142 that are varied in embodiments include, but are not limited to, density, tensile strength, compressive strength, hardness, and rigidity or stiffness.

To further enhance noise reduction, particles 141 dispersed in at least part of the foam 140 in embodiments are in a particular range of sizes and particular materials to absorb, reflect, dampen, or otherwise reduce desired frequencies of sound. Multiple ranges of sizes and/or multiple materials are used to handle multiple frequencies or frequency ranges of sound to be reduced. For example, particles of polytetrafluoroethane of from about 5 microns to about 10 microns will absorb sounds in a range of from about 5000 Hertz (Hz) to about 6000 Hz, while particles of steel wire of from about 0.5 millimeters to about 1.5 millimeters will absorb sound in a range of from about 500 Hz to about 600 Hz.

FIGS. 3 and 4 show another example of a tire 100 according to an embodiment of the invention. As in the example of FIGS. 1 and 2, the example of FIGS. 3 and 4 has two sidewalls 110 connected by a tread 120 to define a tire cavity 130, and bead portions 111 that facilitate mounting of the tire 100 on a wheel. Noise reducing foam 140 is still present and can advantageously have particles 141 dispersed therein. However, in an embodiment the noise reducing foam 140 extends part way into the tire cavity 130 instead of filling it. In an embodiment, the toroidal body 142 formed by the noise reducing foam 140 includes a coating or film 143 on its outer surface in the tire cavity 130 to enhance noise reduction. The coating or film 143 in an embodiment is sound reflective, though in other embodiments the sound reflective coating instead of or in addition to being sound reflective is sound absorbing. Suitable materials for the film include but are not limited to aluminized mylar (PET), a metal mesh in a mylar or other polymer film, or any other material having sound reflective or sound absorbing characteristics suitable for the purposes disclosed herein.

FIGS. 5 and 6 show an example of a tire 100 that is based on the example shown in FIGS. 3 and 4. As seen in FIGS. 5 and 6, substantially radially extending buttresses 150 are disposed within the tire cavity 130. The buttresses 150 add strength to the tire and can advantageously divide the tire cavity 130 into separate compartments. In embodiments in which the tire cavity 130 contains pressurized gas, the buttresses 130 can form seals with the toroidal body 142 so that the compartments are substantially air tight. Such air tight compartments greatly reduce circulation of gas within the tire cavity 130, which can further reduce noise and can enhance tire performance. Embodiments can further include valves 151 that selectively allow fluid communication between compartments.

The particular dimensions of the buttresses 150 will vary depending on the strength required and whether the buttresses 150 are to form air tight compartments. An embodiment has the buttresses 150 extending across the entire cross section of the tire cavity 130 as seen in the example of FIGS. 7 and 8. In embodiments employing buttresses 150, the noise reducing foam 140 can extend partly into the tire cavity 130 as shown in FIGS. 3-6 and can also fill the tire cavity 130 as shown in FIGS. 1 and 2. A manufacturing method includes forming the tire cavity 130 with the sidewalls 110 and tread 120, forming the buttresses 150, and applying the noise reducing foam 140 so that the noise reducing foam 140 fills the circumferential volume, at least to the radial extent of the toroidal body 143 into the tire cavity 130, between and around the buttresses.

Embodiments of the low noise tire 100 are used in a vehicle tire system 200, an example of which is seen schematically in FIG. 9. A system controller 220 is in signal communication with a sensor 210 arranged to monitor a characteristic of a tire 100 according to an embodiment. The characteristic can include tire pressure, tire strain, tire temperature, and/or other characteristics of the tire 100, and more than one sensor 210 can be employed to obtain multiple measurements of a characteristic and/or to monitor multiple tire characteristics.

The system controller 220 includes a computer processor 221 that receives the signal from the sensor 210 and that is in communication with a computer readable storage medium 222 containing computer executable instructions 223, such as executable computer code. Additionally, the computer processor 221 is in communication with an alarm initiating circuit 224, though in an embodiment the computer processor 221 includes the alarm initiating circuit 224 and/or performs the function of the alarm initiating circuit 224 as a result of executing computer executable instructions 223.

The computer processor 221 and/or the alarm initiating circuit 224 are in communication with one or more devices, including, but not limited to, an indicator 230, such as a light on a dashboard, a display 240, such as a computer display, a sound generating system 250, such as a speaker, and a communications system 260, such as a cellular or satellite telephone, or any other wireless communication system suitable for the purposes disclosed herein. In embodiments, the computer executable instructions 223, when read and executed by the computer processor 221, cause the computer processor 221 to, responsive to the characteristic monitored by the sensor 210 departing from a predefined range of values, initiate an alarm with the alarm initiating circuit 224. For example, in embodiments in which the tire 100 contains pressurized gas, the sensor 210 can be a tire pressure sensor, such as a sensor mounted in fluid communication with the tire cavity 130. When the tire pressure becomes too high, such as above about 45 pounds per square inch, or too low, such as below about 25 pounds per square inch, the computer processor 221 causes an alarm to be initiated. The range of values provided above is an example for illustrative purposes, and other ranges of values are used in embodiments as appropriate for a particular tire implementation and/or vehicle installation.

In embodiments, the alarm comprises illuminating an indicator 230, such as an indicator light on a dashboard or an indicator on the display 240 of the vehicle, such as a LCD (liquid crystal display), LED (light emitting diode), OLED (organic light emitting diode), CRT (cathode ray tube), or other type of display as may be used with computer systems and user interfaces. The alarm can also include producing an audible alarm in the interior of the vehicle, such as via the sound generating system 250. The alarm can also include providing information regarding a closest service center via the display 240 or the sound generating system 250. In embodiments, the system 200 can further act, as part of the alarm, to limit the speed of operation or distance to travel of the vehicle so as to prolong effective performance of the tire 100 and can display or announce information regarding distance traveled since the monitored characteristic departed from the predefined range of values, distance remaining before performance of the tire 100 substantially degrades, or other information as may be applicable in a given installation. The alarm can further include use of the communications device 260 to call for assistance, such as via a remotely located assistive service 300. An example of such an assistive service is the OnStar hands-free communication service offered by General Motors Corporation, which owns the rights to the mark, ONSTAR.

A method according to embodiments is realized via, and a system according to embodiments includes, computer-implemented processes and apparatus for practicing such processes, such as the system controller 220 and/or computer processor 221. Additionally, an embodiment includes a computer program product including computer code 223, such as object code, source code, or executable code, on tangible media, such as magnetic media (floppy diskettes, hard disc drives, tape, etc.), optical media (compact discs, digital versatile/video discs, magneto-optical discs, etc.), random access memory (RAM), read only memory (ROM), flash ROM, erasable programmable read only memory (EPROM), or any other computer readable storage medium 222 on which the computer program code 223 is stored and with which the computer program code 223 can be loaded into and executed by a computer. When the computer executes the computer program code, it becomes an apparatus for practicing the invention, and on a general purpose microprocessor, specific logic circuits are created by configuration of the microprocessor with computer code segments. A technical effect of the executable instructions is to implement tire monitoring so that, in the event of an abnormal condition of one or more vehicle tires 100, an alarm is initiated to warn the vehicle operator, provide assistance and information regarding the abnormal condition, and/or provide assistance and information regarding obtaining help in repairing or replacing the one or more tires 100. An additional technical effect of the executable instructions that may be included is to limit vehicle operation, such as by providing a control signal for limiting speed or distance of travel of the vehicle, to prevent substantial degradation of the one or more tires 100.

The computer program code is written in computer instructions executable by the controller, such as in the form of software encoded in any programming language. Examples of suitable programming languages include, but are not limited to, assembly language, VHDL (Verilog Hardware Description Language), Very High Speed IC Hardware Description Language (VHSIC HDL), FORTRAN (Formula Translation), C, C++, C#, Java, ALGOL (Algorithmic Language), BASIC (Beginner All-Purpose Symbolic Instruction Code), APL (A Programming Language), ActiveX, HTML (HyperText Markup Language), XML (eXtensible Markup Language), and any combination or derivative of one or more of these.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A tire comprising:
   a pair of sidewalls in spaced apart relation and extending substantially radially from a respective inner circumferential portion to a respective outer circumferential portion;
   a tread extending between and connecting outer circumferential portions of the sidewalls;
   at least a portion of a tire cavity defined by the tread and sidewalls;
   a bead portions on the inner circumferential portions of each radially extending sidewall, the bead portion providing an engagement surface for engaging a wheel on which the tire is to be mounted;
   a noise reducing foam substantially filling the tire cavity; and
   a plurality of noise-reducing particles dispersed in the noise reducing foam, wherein the plurality of noise-reducing particles comprise at least one of polytetrafluoroethane and steel wire, wherein a material characteristic of the foam changes with radial distance from the inner circumferential portion of the radially extending sidewalls.

2. The tire of claim 1 wherein the foam is an open cell foam.

3. The tire of claim 1 wherein the foam is a closed cell foam.

4. The tire of claim 1 wherein the material characteristic is density.

5. The tire of claim 1 wherein the material characteristic is a ratio of open cell to closed cell foam components.

6. The tire of claim 1 wherein the noise-reducing particles comprise at least one size range, the size range being characterized by an ability of the particles to reduce a particular frequency range of sound in the tire cavity.

7. The tire of claim 6 wherein the at least one size range comprises a plurality of size ranges, each size range being characterized by an ability of the respective particles to reduce a respective particular frequency range of sound in the tire cavity.

8. A tire comprising:
   a pair of sidewalls in spaced apart relation and extending substantially radially from a respective inner circumferential portion to a respective outer circumferential portion;
   a tread extending between and connecting outer circumferential portions of the sidewalls;
   at least a portion of a tire cavity defined by the tread and sidewalls;
   a bead portion on the inner circumferential portion of each radially extending sidewall, the bead portion providing an engagement surface for engaging a wheel on which the tire is to be mounted;
   a noise reducing foam substantially filling the tire cavity; and
   a plurality of noise-reducing particles dispersed in the noise reducing foam, wherein the plurality of noise-reducing particles comprise at least one of polytetrafluoroethane and steel wire, further comprising at least one radial buttress extending from inner surfaces of the sidewalls and tread.

9. The tire of claim 8 wherein the at least one radial buttress extends across the entire cross section of the tire cavity.

10. The tire of claim 9 wherein the at least one radial buttress comprises at least two radial buttresses symmetrically arranged with respect to a circumference of the tire, each respective consecutive pair of radial buttresses defining a tire cavity compartment therebetween.

11. The tire of claim 10 wherein at least one radial buttress includes a valve to selectively permit fluid flow between tire cavity compartments.

12. The tire of claim 8 wherein the foam forms a substantially toroidal body extending from an inner circumferential portion of the tire cavity.

13. The tire of claim 12 wherein the substantially toroidal body extends at least part way into the tire cavity and carries a sound reflective coating on an outer surface of the substantially toroidal body.

* * * * *